United States Patent
Bourne et al.

(10) Patent No.: US 6,814,070 B2
(45) Date of Patent: Nov. 9, 2004

(54) MOLDED POLYMER SOLAR WATER HEATER

(75) Inventors: Richard C. Bourne, Davis, CA (US); Brian E. Lee, Monterey, CA (US)

(73) Assignee: Davis Energy Group, Inc., Davis, CA (US)

( * ) Notice: Subject to any disclaimer, the term of this patent is extended or adjusted under 35 U.S.C. 154(b) by 0 days.

(21) Appl. No.: 10/336,559

(22) Filed: Jan. 6, 2003

(65) Prior Publication Data

US 2004/0129267 A1 Jul. 8, 2004

(51) Int. Cl.[7] ............................................. F24J 2/36
(52) U.S. Cl. ...................... 126/623; 126/641; 126/655; 126/704
(58) Field of Search ............................... 126/628–629, 126/621–624, 651–655, 704–710, 570, 569, 634, 640–642, 648

(56) References Cited

U.S. PATENT DOCUMENTS

| 4,147,155 | A | * | 4/1979 | Kraft | 126/704 |
| 4,170,983 | A | * | 10/1979 | Sadler | 126/705 |
| 4,205,655 | A | * | 6/1980 | Hunt | 126/635 |
| 4,274,548 | A | * | 6/1981 | Schneider | 220/675 |
| 4,287,882 | A | * | 9/1981 | Mattson | 126/678 |
| 4,289,113 | A | * | 9/1981 | Whittemore | 126/704 |
| 4,418,685 | A | * | 12/1983 | Frazier | 126/623 |
| 4,423,718 | A | * | 1/1984 | Garrison | 126/655 |
| 4,440,154 | A | * | 4/1984 | Bellows | 126/694 |
| 4,454,863 | A | * | 6/1984 | Brown et al. | 126/622 |
| 4,557,251 | A | * | 12/1985 | Burkhardt | 126/710 |
| 4,622,951 | A | * | 11/1986 | Matzkanin | 126/710 |

FOREIGN PATENT DOCUMENTS

FR        0027773      * 10/1980   ................ 126/652

* cited by examiner

Primary Examiner—James C. Yeung
(74) Attorney, Agent, or Firm—Oliff & Berridge, PLC (57) ABSTRACT

A solar water heater has a rotationally-molded water box and a glazing subassembly disposed over the water box that enhances solar gain and provides an insulating air space between the outside environment and the water box. When used with a pressurized water system, an internal heat exchanger is integrally molded within the water box. Mounting and connection hardware is included to provide a rapid and secure method of installation.

30 Claims, 7 Drawing Sheets

MOLDED POLYMER SOLAR WATER HEATER

This invention was made with Government support under Contract #DE-AC36-99G010337 awarded by the United States Department of Energy. The Government has certain rights in the invention.

BACKGROUND OF THE INVENTION

1. Field of Invention

This invention relates to solar water heating devices. More particularly, the invention relates to devices that combine heat collection and hot water storage in a single "passive" unit known as an "integrated collector/storage" or "ICS" unit.

2. Description of Related Art

Solar energy holds great promise for heating domestic water for residences. However, installation costs for solar water heating systems have typically been too high for economic viability. Solar collection systems of moderate efficiency can typically supply 40 to 70% of annual residential water heating requirements using only 30 to 40 square feet of roof surface. A combination of installation difficulties and high component costs cause paybacks to exceed ten years for these relatively small systems. Available systems divide into active and passive categories. An active system requires a pump and electrical source to circulate water through a rooftop solar collector component, returning the heated water to an insulated water container. A passive system does not require a pump to circulate water or other heating fluid. Integral collector/storage (ICS) units offer particular promise for reducing costs because they minimize the total surface area of system components, in addition to eliminating moving parts and electrical connections.

ICS designs have been in use for many years. Traditional "breadbox" ICS units place a cylindrical metal tank under a glazing. The tank is typically under city water pressure. When the sun shines, water passing through the tank is heated on its way to fixtures or an auxiliary water heater. While many such breadbox units have been site-built, several U.S. manufactured units were widely marketed in the 1970's and early 1980's until federal and state tax subsidies were no longer available. These units used either stainless steel or "glass-lined" steel tanks placed in insulated boxes. Plastic glazings were used as top covers to admit solar energy and limit tank losses to the environment during non-solar conditions. The tanks for "breadbox" units typically contain 30 to 60 gallons of water. The concentrated weight of the units, due to the water, further complicated installation because roof reinforcement was often required. While overnight tank losses limit ICS "solar fraction" compared to active systems with well-insulated indoor tanks, the lower installed cost, and the elimination of energy costs for pumping, give ICS units an advantage in many applications.

Although less costly than active systems, available ICS systems are still too expensive for significant market penetration in either new home or retrofit applications. Two ICS units currently being marketed resolve the concentrated weight problem by using a "parallel tube" design that distributes the pressurized water relatively uniformly in a rectangular box. For example, a 3' by 8' ICS unit places 6 or 8, 3" to 4" diameter horizontal tubes side-by-side, joining them at alternating ends to create a serpentine flow pattern from cold water entering one end of the bottom tube to solar-heated water leaving the tube at the top. However, these simple, durable units are expensive to manufacture due to the high cost and weight of the large copper tubes needed to contain pressurized water without corrosion.

Unnecessarily high manufacturing costs of known ICS systems also result from the design of the enclosure that surrounds the parallel tube array. A flat rectangular box with 4" internal tubes is typically fabricated from 7" tall aluminum perimeter extrusions. A flat $\frac{1}{8}$" thick glass cover sheet is held to the perimeter members with a smaller aluminum extrusion forming a channel that includes a small rubber channel gasket strip that captures the glazing. The corners of the aluminum extrusions are mitered and secured with corner clips. The lower outsides of the main extrusion profile have features that accommodate aluminum clips for securing the ICS unit to the roof rack that is secured to the roof. An aluminum sheet bottom panel is also supported by the perimeter extrusions. The bottom and walls are typically lined with about 1" of rigid isocyanurate foam insulation that is cut from larger panels. All of the enclosure components are relatively expensive, and require substantial factory labor to prepare and assemble.

Although the uniform weight distribution of available ICS units somewhat reduces installation difficulties, these "parallel tube" ICS units still require substantial on-site labor to install. Furthermore, a unit will typically weigh at least 300 pounds before filling with water, requiring a crane or boom truck to lift into place. The units are usually supported above the roof surface on racks that require four connection points through the roof. Such rack-mounting is customary to allow the roof to "breath" under the collector, where debris and moisture might otherwise collect and rot, thereby accelerating roof degradation. Because the spacing of roof structural members may vary, securing the rack often becomes a custom project. Also, the required piping penetrations are not at the four support bolt locations, resulting in at least six different roof penetration locations, each requiring careful sealing and/or flashing to prevent leakage. Such mounting methods also risk damage to the roof structure, since bolts driven downward into roof structural members (now more heavily loaded) may weaken the structural members.

Current breadbox solar water heaters also have aesthetic liabilities associated with their size and rack mounting. One of the damaging legacies from the failed solar heating movement of the 1970's and early 1980's is that roof-mounted solar heating equipment is not particularly attractive. Units 8" thick supported on racks another 4" above the roof have high visibility, and look out of place on many residential roofs.

For these and other reasons, there is a need for a low cost, lower profile ICS solar water heater that can easily and quickly be installed on both new or existing residences, that minimizes the danger of water leakage through the roof, and that brings solar water heating into an affordable budget range for households in sunny climates throughout the world.

SUMMARY OF THE INVENTION

The present invention is directed to an integrated collector/storage (ICS) solar water heater. The apparatus and methods of the invention include the use of molded polymer technology to reduce the cost of materials and the number of parts that must be assembled to manufacture the ICS unit. The invention also includes support and connection features that eliminate the need for a mounting rack, significantly reducing the cost of installation labor, and reduces or minimizes the likelihood of leakage at mounting surface penetration points.

In an exemplary embodiment of the invention, the apparatus and methods of the improved ICS solar water heater include a rotationally-molded fluid container ("water box") with an internal heat exchanger, a glazing subassembly, and a mounting/connection hardware kit. In one embodiment, the heat exchanger contains pressurized water in small, thin-walled copper tubes that are surrounded by solar heated water in the water box which is under "atmospheric pressure". Because the water box is not pressurized beyond atmospheric pressure, the walls of the water box may be relatively thin, as compared to existing ICS units, thereby decreasing weight, reducing production costs and improving heat transfer. In the exemplary embodiment, the water box comprises two essentially parallel sheets, joined by spaced "through-connects", and four sides providing a closed perimeter. The water box may be produced by rotational molding.

In an exemplary embodiment of the apparatus and methods of invention, the molded fluid container, or water box, is designed to rest directly on a mounting surface, such as a roof surface by using a water box having a ribbed bottom with vent passages that are open along their lower edge. The space formed between the ribs may be closed at their upper ends to prevent debris from being deposited under the water box. This feature provides for ventilation between the water box and the mounting surface to remove moisture.

In an exemplary embodiment of the apparatus and methods of invention, the water box is tapered from a narrower profile at the bottom of the water box to a thicker profile at the top of the water box. The taper provides more internal space in the top portion of the water box, where the heat exchanger is located, and reduces the length of the through-connects at the bottom portion of the water box, where water pressure is highest.

In an exemplary embodiment of the apparatus and methods of invention, the water box may include a metal underside strut located in a vent passage of the water box formed by the ribs disposed on the bottom surface of the water box. The strut facilitates connection of the ICS unit to a single structural member on a mounting surface, thereby simplifying layout and connections by eliminating the need to consider varying spacings of particular structural members, such as roof rafters or trusses, for example. The strut may be integrated with mounting hardware, such as upper and lower brackets and mounting plates that are pre-secured to the mounting surface thereby facilitating the rapid and secure mounting of the ICS unit. For example, in an exemplary embodiment, the brackets surround a framing member thus avoiding weakening the member by driving large fasteners such as lag bolts into the framing member.

In yet another exemplary embodiment of the apparatus and methods of the invention, the glazing subassembly includes a formed polymer glazing with integral ribs and a rim that minimize the size of the rigid perimeter extrusions that strengthen the lower glazing edge, hold two flexible sealing strips, and facilitate securing the glazing subassembly to the water box and mounting points.

In an exemplary embodiment of the apparatus and methods of the invention, mounting hardware is provided that connects to the strut disposed on the underside of the water box and facilitates all connections between the mounting surface and the ICS unit along the vertical centerline of the unit. In an exemplary embodiment, the hardware for mounting the ICS unit on a roof includes below-roof brackets and above-roof mounting plates. The below-roof brackets surround a rafter or truss framing member and provide connection means to the above-roof plates. In addition to providing a secure connection that does not damage the framing member, the top bracket also holds and aligns the supply and return water lines for connection to the heat exchanger stub-outs of the water box. The upper above-roof mounting plate also includes a closed-cell foam gasket to provide a seal around roof penetrations. The lower above-roof mounting plate also provides a seal around roof penetrations.

These and other features and advantages of this invention is described in or are apparent from the following detail description of various exemplary embodiments of the systems and methods according to the invention.

BRIEF DESCRIPTION OF THE DRAWINGS

Various exemplary embodiments of the apparatus and methods according to this invention will be described in detail with reference to the following drawings in which like reference numerals refer to like elements and wherein.

DETAILED DESCRIPTION OF PREFERRED EMBODIMENTS

Various exemplary embodiments of the apparatus and methods according to the present invention are described hereafter, with reference to the drawings.

Figure 1:
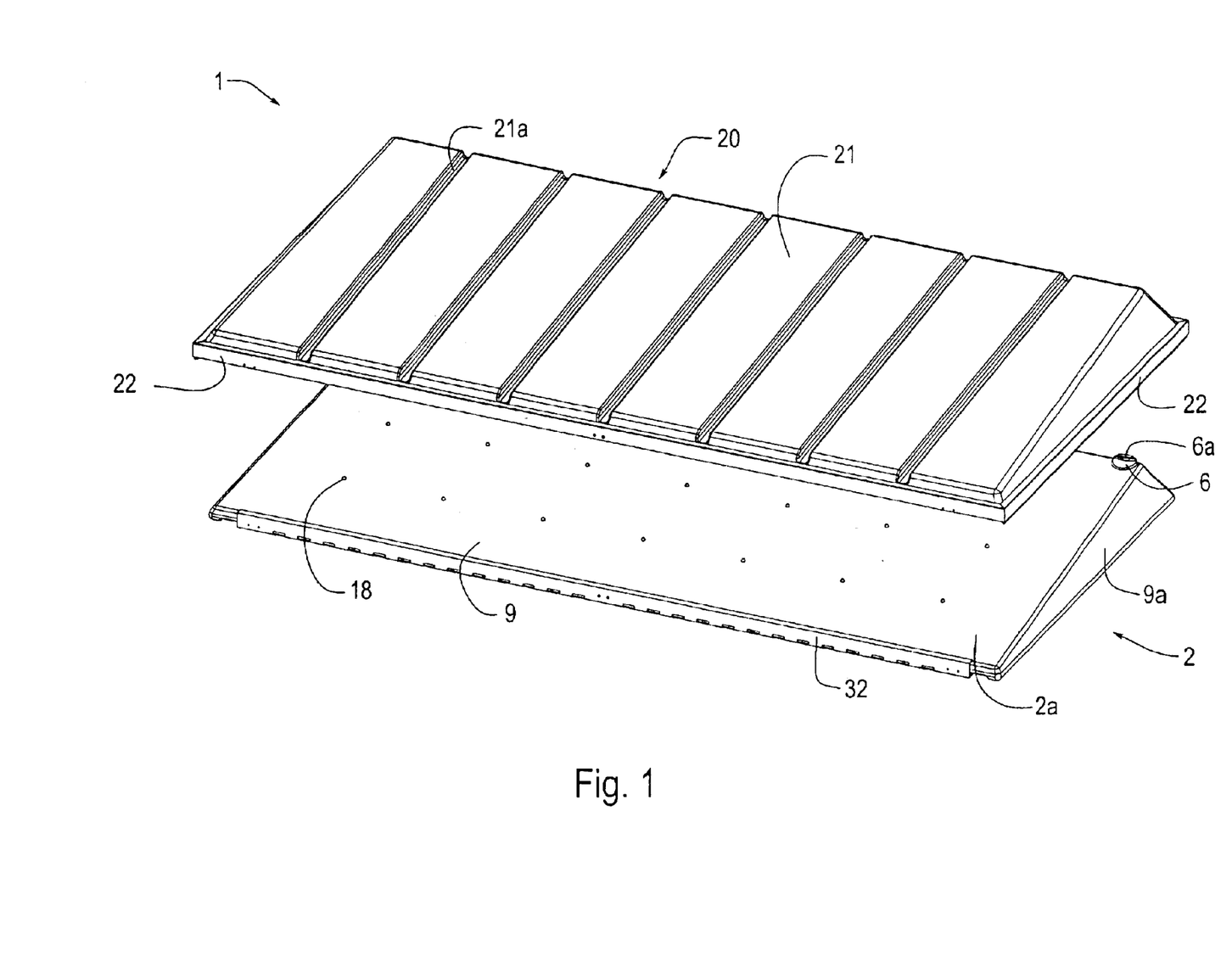
FIG. 1 is an exploded isometric view of the water box subassembly and the glazing assembly of an exemplary embodiment of the invention.
Figure 2:
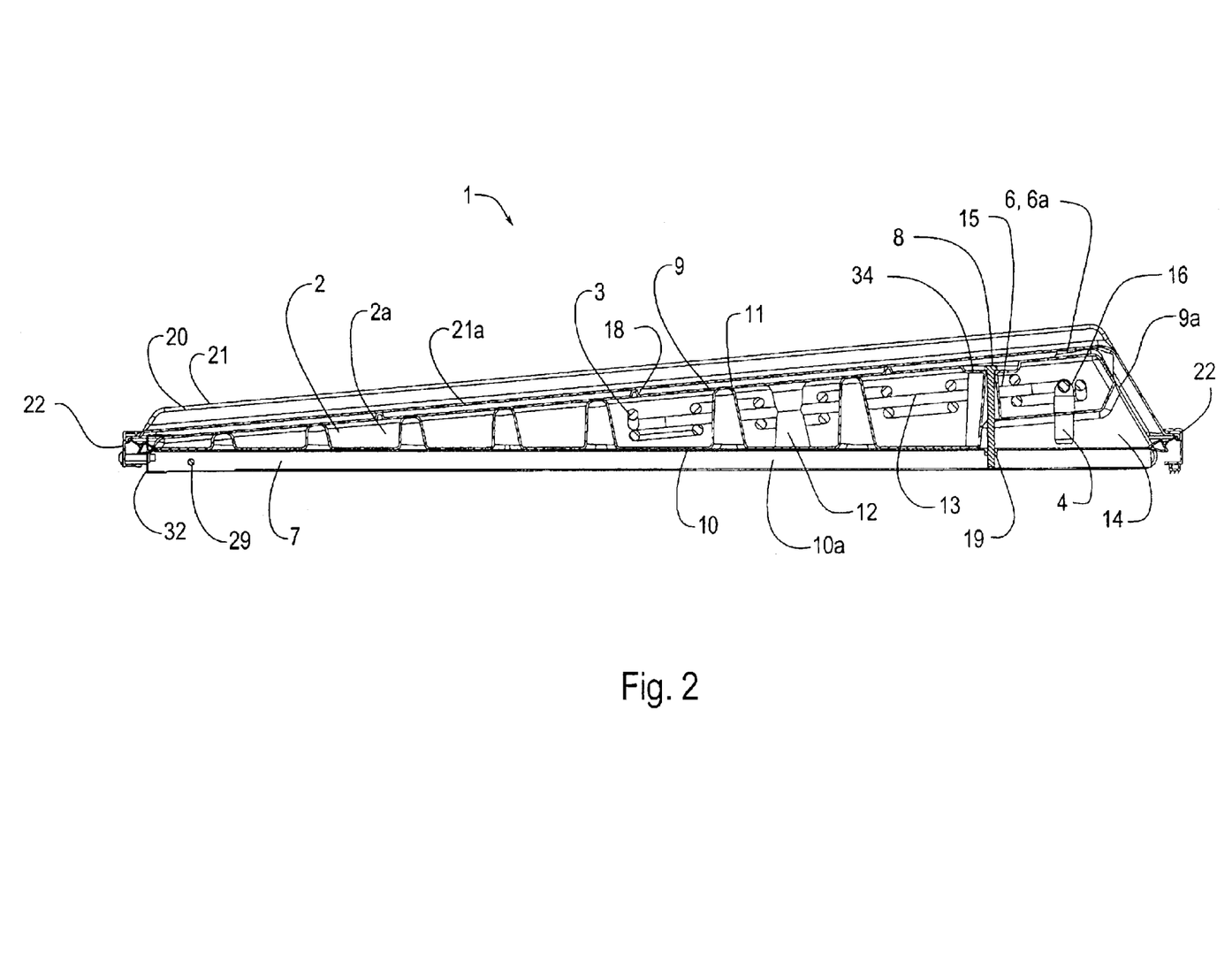
FIG. 2 is a vertical cross-sectional view through the center of an exemplary embodiment of an ICS solar water heater according to the invention.
Figure 3:
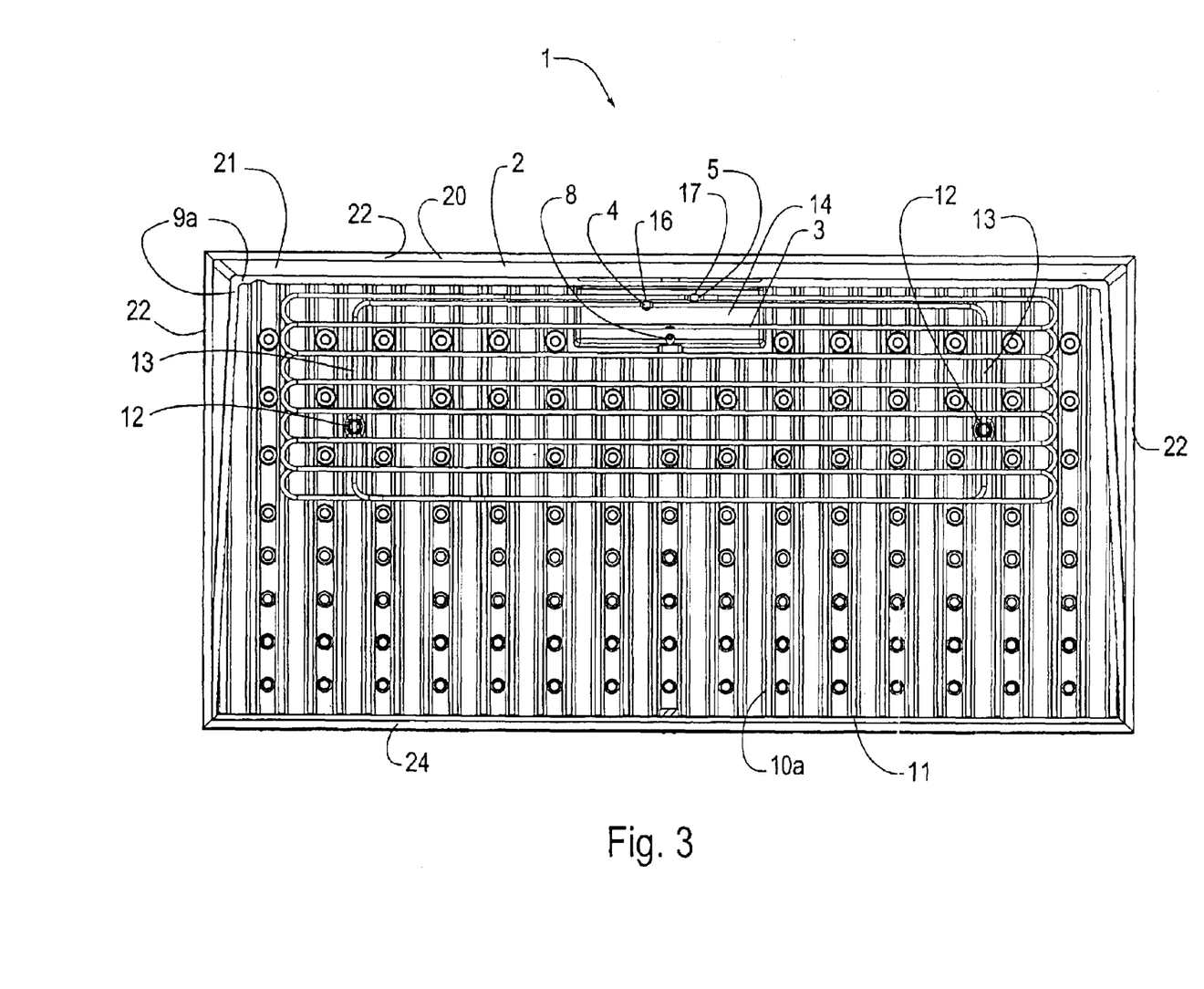
FIG. 3 is a horizontal cut view through the principal plane of an exemplary embodiment of the ICS unit according to the invention.

FIG. 1 shows an exploded isometric view of the water box subassembly 2 and the glazing subassembly 20 of an exemplary embodiment of the invention. FIG. 2 shows a vertical cross-sectional view of an exemplary embodiment of the invention including a polymer-based ICS solar water heater having a water box subassembly 2 and a glazing subassembly 20. FIG. 3 shows a horizontal cut view through the principal plane of the ICS solar water heater including the water box subassembly 2 and through-connects 11, a heat exchanger 3 contained within the water box 2a, and locations of exemplary connections through the roof. These and other features of an exemplary embodiment of the present invention are described in the following paragraphs with reference to FIGS. 1–3.

As shown in FIGS. 1–3, an exemplary embodiment of the invention includes an ICS unit 1 having a water box subassembly 2 and a glazing subassembly 20. The water box subassembly 2 is comprised of a molded fluid container, or water box 2a, an internal heat exchanger 3 with a water inlet 4 and a water outlet 5, fill ports 6 and fill port covers 6a, and a connection strut 7 with a support toe 32.

In an exemplary embodiment, the water box 2a may be molded with the internal heat exchanger 3 already in place using rotational molding. In the embodiment, rotational molding of the water box 2a facilitates the formation of a sealed, one-piece water box at a relatively modest cost. The rotational molding process also allows pre-placement of the heat exchanger 3 in the mold.

Although the exemplary embodiment shown if FIGS. 1–3 includes a water box 2a having an internal heat exchanger 3, the invention also contemplates a water box 2a without a heat exchanger 3. For example, a gravity flow hot water outlet may be used such that hot water in the water box 2a flows directly to fixtures. A water inlet float valve assembly, or other fill device, may be used to replenish the water level in the water box 2a.

During the molding process, the heat exchanger 3 is placed in a mold and granular plastic is fed into the mold. The mold is then heated and rotated to form the water box 2a. The finished water box 2a emerges from the mold with an internal heat exchanger 3 having extensions penetrating through a surface of the water box 2a that are leak resistant and/or leak proof. Structural connections, or through-connects 11, may also be placed in the mold prior to processing. In an exemplary embodiment of the invention, the through-connects 11 may be shaped as truncated cones having tapered walls and are formed integrally with the absorber 9 and the bottom box wall 10 during the molding process. The tapered walls of the truncated cone shape assist in de-molding the water box 2a after the melted plastic granules are uniformly distributed or "sintered" on the mold walls. Because the ICS unit 1 must withstand summer "stagnation" conditions, i.e., substantial solar input and no hot water draws, a relatively high temperature polymer, for example, cross-linked polyethylene, or the like, may be used for the formation of the water box 2a. In an exemplary embodiment of the invention, the polymer may be stabilized with carbon black, or the like, to limit UV degradation due to incident sunlight.

Because the heat exchanger 3 contains pressurized domestic water, the ICS unit 1 does not need to withstand the 40 to 80 psi internal pressure of known ICS units having large cylindrical tanks and/or large diameter copper tubes. In an exemplary embodiment of the invention, an ICS unit 1 about 4' high and about 8' wide that is mounted at about a 45° slope, has a maximum internal pressure at the bottom portion of the water box 2a that is less than about 1.3 psi. Even at this low pressure, structural connections may be disposed between the absorber surface 9 and the bottom box wall 10 to withstand hydraulic loads.

In an exemplary embodiment of the invention, the height of the water box 2a is tapered from a narrower profile at the bottom end to a thicker profile at the top end. The taper provides more internal space in the top portion of the water box 2a, where the heat exchanger 3 is located. The taper also reduces the length of the through-connects 11 located at the bottom portion of the water box 2a where water pressure in the water box 2a is highest and the through-connects 11 are most closely spaced. The taper also tilts the absorber surface 9 to a more favorable angle on most mounting surfaces, such as roofs having a relatively low slope, to absorb sunlight. The low profile of the ICS unit 1 also improves the appearance of the roof by reducing the profile of the ICS unit 1 roof at the lower edge of the roof where the ICS unit 1 is most visible.

The water box 2a also has four edges 9a that slope inward from the bottom box wall 10 toward the absorber surface 9. Thus, the edges 9a function as part of absorber surface 9 thereby eliminating the need for side insulation and further lowering the apparent profile of the ICS unit 1.

In an exemplary embodiment, the water box 2a includes a ribbed bottom that allows the water box to be placed directly on a mounting surface. In the embodiment, vertical ribs 10a extend downwardly from the bottom box wall 10 to create air spaces between the ribs 10a and prevent moisture from accumulating between the ICS unit 1 and the mounting surface. In an exemplary embodiment, the ribs 10a extend approximately ½" below the bottom wall 10 and may be approximately 1" wide and spaced apart on 3" centers. The through-connects 11 may be placed between alternating ribs. In an exemplary embodiment, the ribs 10a may be closed along the top edge 9a of the water box 2a to prevent continuous upward air circulation between the ribs 10a and allow moisture to vent outward at the lower edge 9a of the water box 2a.

In an exemplary embodiment, the vertical spacing pattern of the through-connects 11 may be varied in recognition of the load pattern. For example, the through-connects 11 may have a closer spacing at the bottom of the panel where internal pressure is greatest. In another exemplary embodiment, the rows of through-connects 11 located near the bottom end of the water box 2a may be spaced at 4" apart and through-connects located near the top end of the water box 2a may be spaced at 6" apart. In an exemplary embodiment, all through-connects 11 have a cone shape with a one-way taper that narrows toward the top, where the cones are closed.

In an exemplary embodiment of the invention, special through-connects 12, located on each side of a horizontal centerline of the water box 2a, are tapered inwardly from the absorber surface 9 and the bottom box wall 10 toward the horizontal centerline of the water box 2a. The tapered cones meet at an intersection that surrounds and holds vertical tubes 13 of the heat exchanger 3. The special through-connects 12 retain the heat exchanger 3 away from the surfaces of the water box 2a and prevent leakage and improve performance of the water box 2a by minimizing the amount of polymer that adheres to heat exchanger 3 during the molding process.

In an exemplary embodiment of the invention, the internal heat exchanger 3 may be self-supporting and placed to take advantage of the thermal stratification that develops inside the ICS unit 1. The inlet 4 and the outlet 5 may be located near the top of the water box 2a to provide convenient access to the connections. A recess 14 disposed near the top of the water box 2a provides a surface through which the inlet 4 and the outlet 5 emerge and forms a space for completing plumbing and/or mounting connections. In an exemplary embodiment, both the inlet 4 and the outlet 5 may be of ¾" nominal Type M copper tube, or the like. Although ¾" Type M copper tube is disclosed in the exemplary embodiment, other tubing and/or pipe, as well as other nominal wall thicknesses, are contemplated by this invention.

Inside the water box 2a, the inlet 4 and the outlet 5 connect to tees 16 and 17, respectively, that turn into the horizontal plane of the water box 2a and direct water from connection tubes 50 to flow horizontally to two parallel heat exchanger tube sets. The two outlets from the tee 16 connected to the inlet 4, and the two the inlets to the tee 17 connected to the outlet 5, may be of ⅜" nominal Type M tube. The ⅜" tubes are bent or formed into a serpentine shape to form two parallel fluid flow paths of the heat exchanger 3 (FIG. 3). Other sizes and wall thicknesses of pipe and/or tubing may also be used to form the parallel flow paths.

In operation, the inlet water enters tee 16, whose two outlets proceed horizontally and down to become vertical tubes 13 and pass through special through-connects 12 supporting the heat exchanger 3. Near the midline of the water box 2a, the tubes 13 turn horizontally to begin their upward serpentine path. The horizontal serpentine runs are secured to vertical tubes 13 to maintain the serpentine pattern and hold all tubes in the desired plane. Near the top of the unit, the two serpentine sections meet at tee 17 to proceed downward through the outlet 5.

In an exemplary embodiment, fill ports 6 are disposed near the top corners of the water box 2a and are equipped with covers 6a to prevent water and vapor loss from the water box 2a. In an exemplary embodiment, the fill ports 6 may have a diameter of about 1-¼" to allow a standard garden-type hose to be inserted into the water box 2a and allow adequate room for internal air to escape as water fills water box 2a. Although the fill ports are disclosed in the exemplary embodiment as having a diameter of about an 1-¼", other size fill ports are contemplated by this invention.

In an exemplary embodiment, the water box subassembly 2 includes a strut 7 disposed beneath the water box 2a and connected to the water box 2a with a bolt 8 that mates with a nut 19 connected to the underside of the strut 7 through a hole 15 that has been molded along a vertical centerline of the water box 2a. The strut 7 enables rapid connection of the ICS unit 1 to a mounting surface using the mounting hardware, as will be further described herein with reference to FIGS. 4–7. The strut 7 is attached, preferably by welding along all adjoining surfaces, to a support toe 32 at its lower end. The support toe 32 may be either a simple channel shape or be formed to match the profile of the bottom edge 9a of the water box 2a. The strut 7 further includes an upper slotted hole 71 for connection to the roof mounting hardware (FIG. 6). The strut 7 may be connected to the water box 2a before the glazing subassembly 20 is secured to the water box subassembly 2.

In an exemplary embodiment, the strut 7 is a "legs-down" channel-type and includes a horizontal pin 29 spanning between and connected to both sides of the connection strut 7 channel. In an exemplary embodiment, the steel pin 29 may have a diameter of about 5/16" diameter and interlock with the recess 81 in a bottom plate 62, as will be further discussed with reference to FIG. 7. Other size pins are contemplated by this invention.

In an exemplary embodiment, the glazing subassembly 20 includes a glazing panel 21, edge extrusions 22, and other features that will be subsequently described with reference to FIGS. 3a and 3b. In an exemplary embodiment, a molded polymer glazing panel 21 is thermo-formed to provide increased strength from a relatively thin polymer sheet. For example, polycarbonate and/or acrylic materials may be used in this application. However, it is recognized that known polycarbonates display greater strength at high temperatures. Although a molded polymer glazing is described in the exemplary embodiment, other glazing materials currently available or later developed may be used.

In an exemplary embodiment of the invention, the panel 21 may be configured with ribs 21a extending downwardly from the glazing panel 21. The surface of the absorber 9 may be configured with raised nubs 18 to maintain an airspace of approximately ¼" between the underside of the ribs 21a and the absorber surface 9. In an exemplary embodiment, the ribs 21a may be spaced about 12" apart and be about 1" deep to create a gap of approximately 1-¼" between the absorber surface 9 and the glazing panel 21. In another exemplary embodiment, the raised nubs 18 may project downwardly from the glazing ribs 21a toward the absorber 9.

Figure 4:
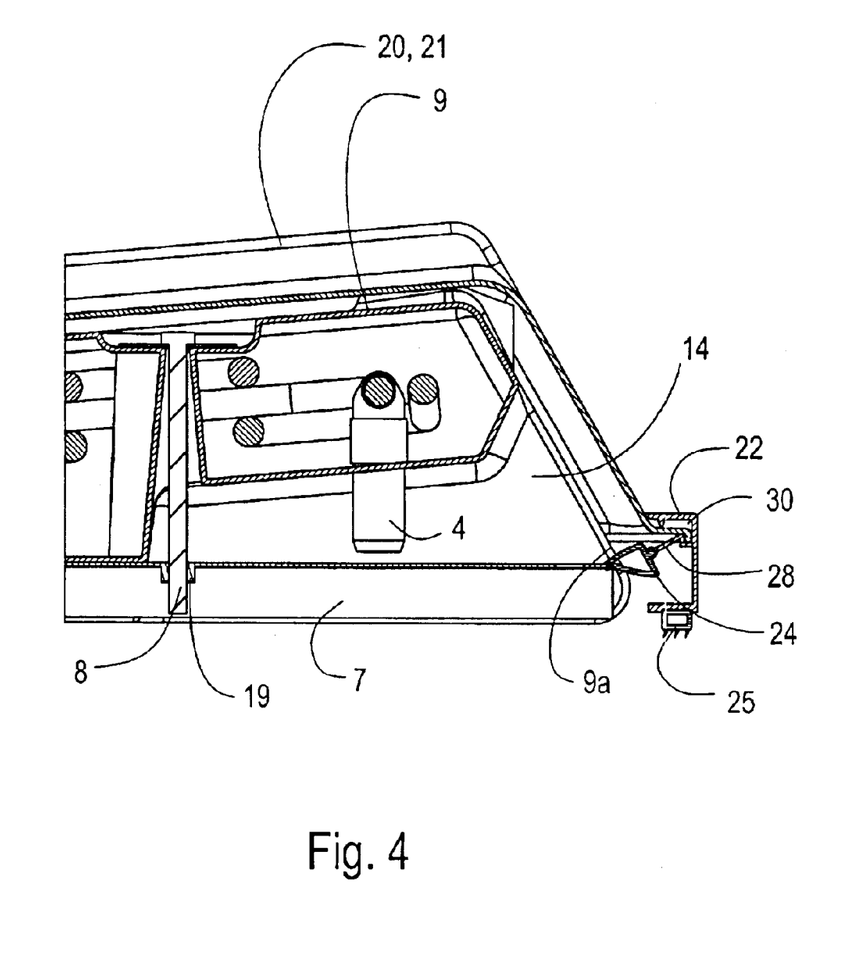
FIG. 4 is a vertical cross-sectional view of the top portion of an exemplary embodiment of the ICS unit according to the invention.
Figure 5:
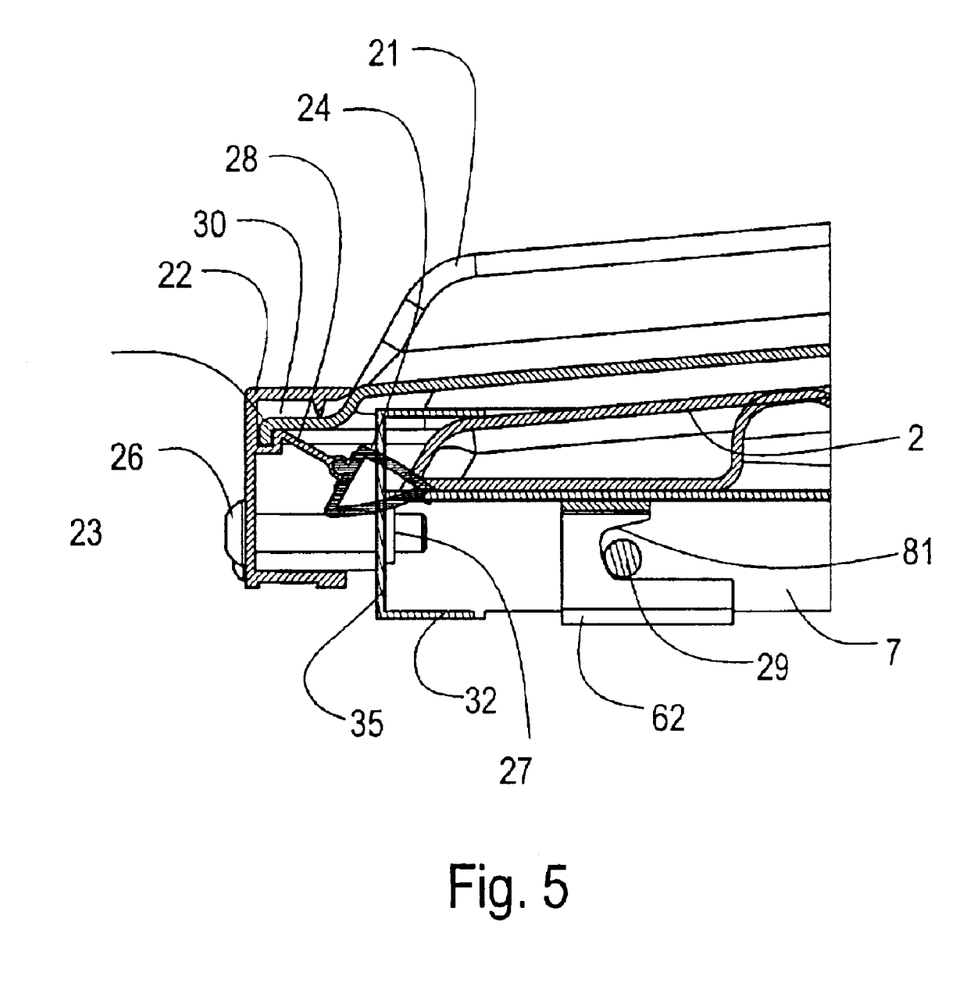
FIG. 5 is a vertical cross-sectional view of the bottom portion of an exemplary embodiment of the ICS unit according to the invention.
Figure 6:
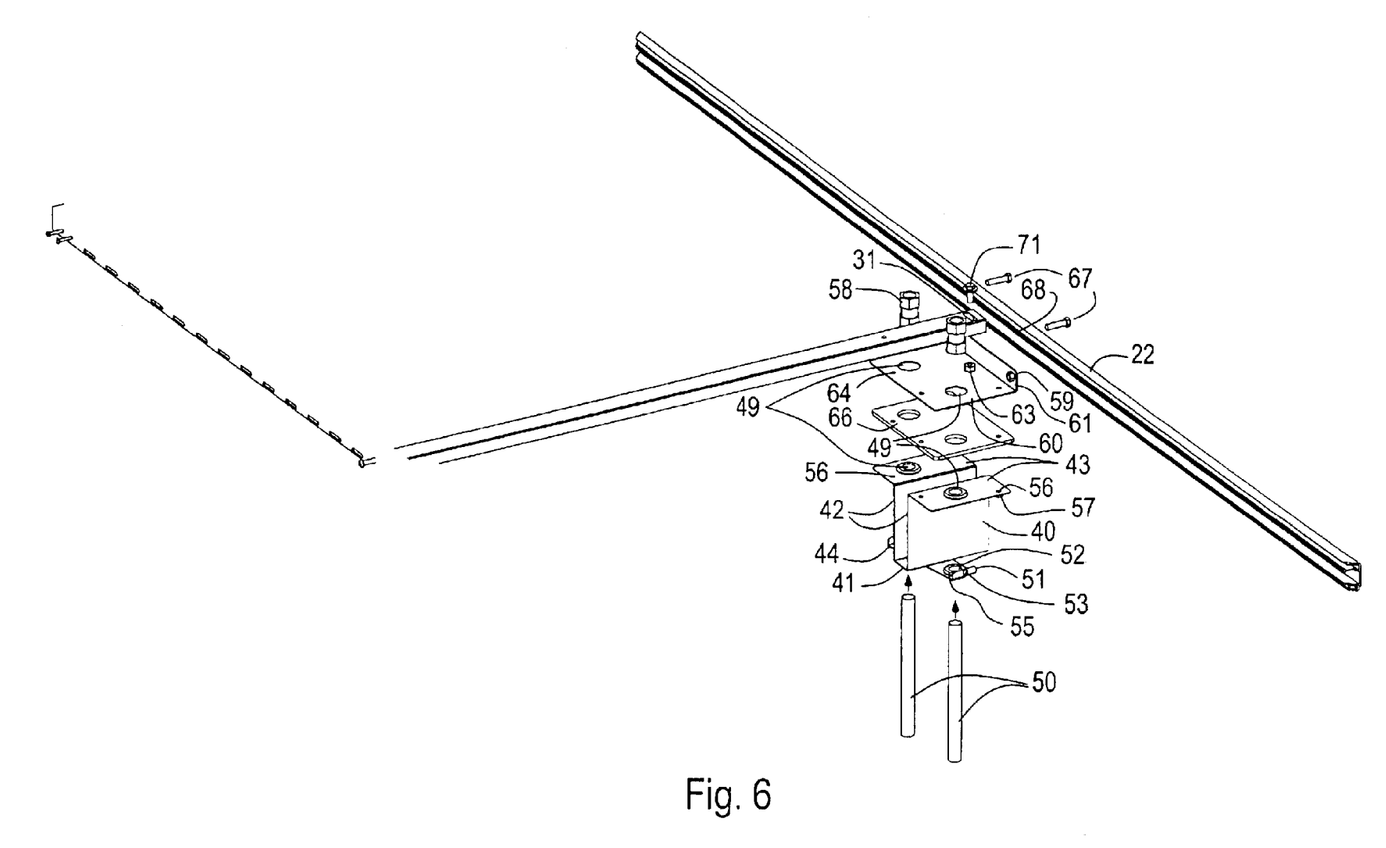
FIG. 6 is an exploded view of an exemplary embodiment of the top mounting hardware set according to the invention.

FIGS. 4 and 5 are vertical cross sectional views showing the top and bottom portions of the ICS unit 1, respectively. In FIGS. 4 and 5, the glazing subassembly 20 includes extrusions 22 and other components that facilitate connecting the glazing subassembly 20 to the water box subassembly 2 and to the mounting components. Features not previously identified in FIGS. 1–3 include an upper sealing strip 24, a lower sealing strip 25, screws 26, and nuts 27. FIG. 5 also shows components of the connection between the ICS unit 1 and the roof mounting hardware.

In an exemplary embodiment, extrusions 22 include recesses 30 that hold downturned edge 23 of glazing panel 21, a projection 28 that retains an upper sealing strip 24, and a recess 33 that retains a lower sealing strip 25. The upper sealing strip 24 is disposed around the entire perimeter of the ICS unit 1 to support the glazing subassembly 20 on the lower sloping edge 9a of the absorber surface 9. The upper sealing strip 24 maintains an air seal along the top and sides of the ICS unit 1 to prevent continuous circulation of air into ICS unit 1. The upper sealing strip 24 also prevents and/or reduces thermal loss from the ICS unit 1.

The lower sealing strip 25 is used along the top end and sides of the water box 2a to provide a seal between the ICS unit 1 and the mounting surface. However, the lower sealing strip 25 is not used along the bottom end of the water box 2a to allow the underside of the ICS unit 1 to "breathe". Instead, a woven strip 35 may be disposed along the bottom to allow air and moisture transfer and prevents foreign objects from entering the air vent spaces.

In an exemplary embodiment of the invention, screws 26 connect extrusion 22 to receiving nuts 27 pre-placed at the middle and outer edges of the support toe 32, at the bottom end of the water box 2a, to secure the glazing subassembly 20 to the water box subassembly 2. Although screws are used as a means of attachment, use of other fasteners are contemplated by this invention. The support toe 32 may be essentially the full width of water box 2a, to provide additional strength resisting wind uplift at the narrow bottom of the ICS unit. This glazing-to-toe connection allows the glazing subassembly 20 to lift upward sufficiently at its top edge for connecting and filling the unit. Removing screws 26 allows the glazing subassembly 20 to be removed from the ICS unit 1 for replacement without disconnecting or moving the water box 2a.

Figure 7:
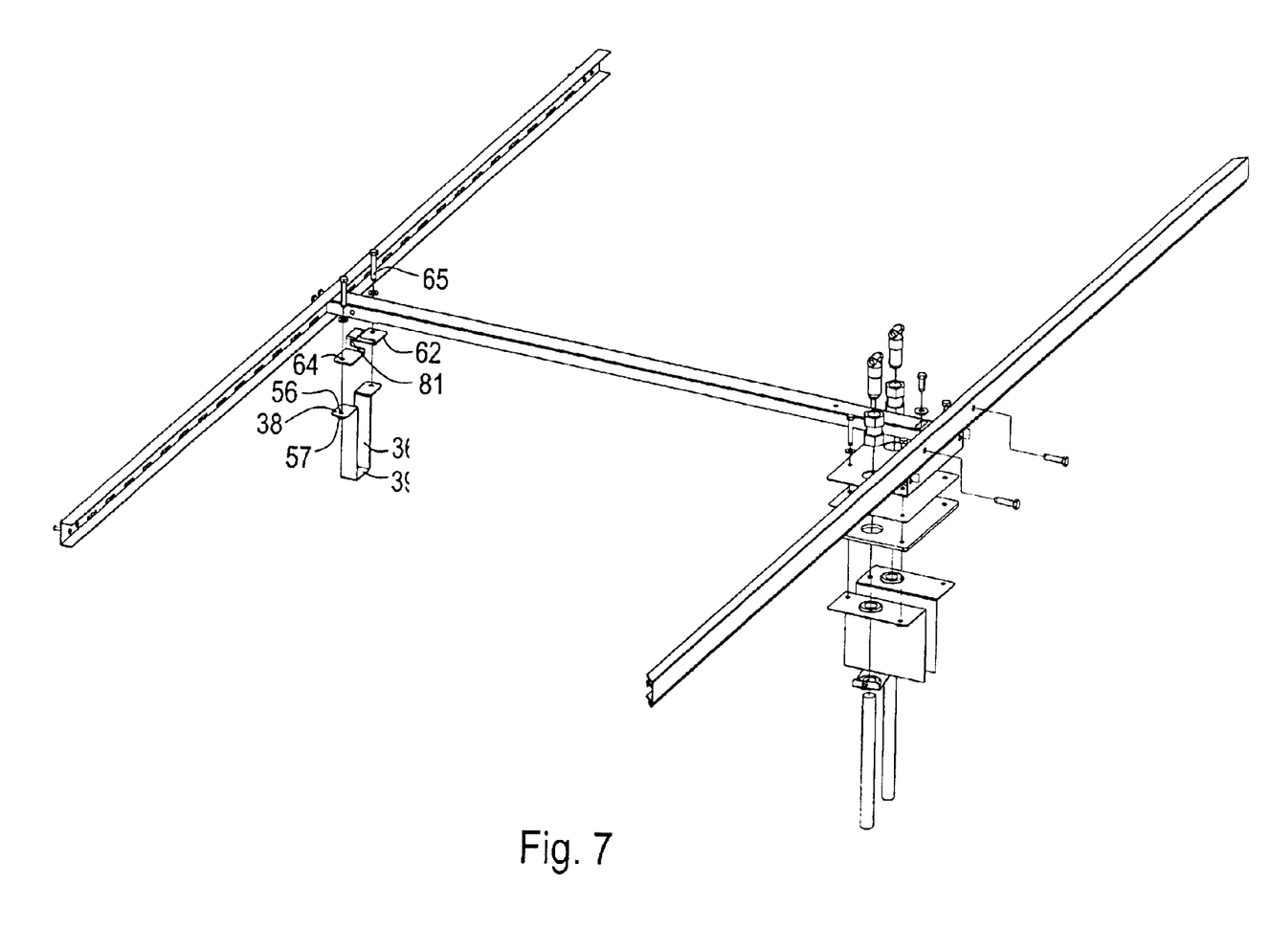
FIG. 7 is an exploded view of an exemplary embodiment of the bottom mounting hardware set according to the invention.

FIGS. 6 and 7 are exploded views of mounting hardware used at the upper and lower ends of the ICS unit 1, respectively, showing how the water box subassembly 2 and the glazing subassembly 20 integrate with mounting hardware components above and below the mounting surface. Although the ICS unit 1 may be mounted to any surface, roof mounting will be discussed as an exemplary mounting surface. The components shown in FIG. 6 include an upper bracket 40 that is placed below the roof and an upper plate 60 that is placed above the roof during installation. The components shown in FIG. 7 include a lower bracket 36 that is placed below the roof and a lower plate 62 that is placed above the roof. These features provide rapid, secure, waterproof roof mounting of the ICS unit 1 without damage to the roof structure.

Operations to place, connect, and fill the ICS unit, and to remove components for service and replacement, according to exemplary embodiments of the invention, are discussed with reference to FIGS. 6 and 7. During system installation, the top edge of the glazing subassembly 20 is secured to the mounting system as described with reference to FIG. 6.

Installation of the ICS unit 1 begins by using an underside template to drill one upper bracket/plate connecting hole. A top-side template is then used to locate the remaining holes for both the top and bottom connections and inlet/outlet pipes. The following description assumes these holes have been drilled before top and bottom mountings are completed. The top mountings are described before the bottom mountings.

In an exemplary embodiment, an upper bracket 40 fabricated of 16 gauge galvanized steel, or the like, is placed below the roof sheet (not shown) and comprises a bottom 41, sides 42, flanges 43 extending orthagonally from the sides 42, and wingpieces 44 connected to the bottom and extending perpendicularly outwardly beyond the sides 42. The bottom 41 is of sufficient size to provide clearance for sides 42 as the upper bracket 40 surrounds a framing member (not shown). In other exemplary embodiments, the upper bracket 40 may be made available in several widths to accommodate alternate framing systems and dimensions. For example, in U.S. applications, 1-½" wide framing members are typically used in new construction. In an exemplary embodiment, "standard" upper bracket 40 therefore has 1-⅝" inside clearance for bottom 41. However, in some "timber" structural systems the framing members are as wide as 3-½", and would therefore use a "non-standard" bracket. In an exemplary embodiment, holes drilled in the roof to allow pipes and/or tubing to be connected to the inlet 4 and the outlet 5 may be spaced approximately 5" apart to accommodate most roof framing techniques.

The sides 42 of the upper bracket 40 extend upwardly to contact the underside of a roof sheet at the flanges 43. The upper bracket 40 may be temporarily held to the framing member (not shown) by various means such as screws or clamps if necessary prior to placement of the upper mounting plates.

The bracket wingpieces 44 include at least one pipe penetration hole 52 to hold and/or receive fluid supply and return connection tubes 50 in alignment until connections are made in the flange 43 above the roof. In an exemplary embodiment, the bracket wingpiece 44 may include a tab 51 having a penetration hole 52 and a screw 53 that passes through a threaded hole 54 in the tab 51 to retain the tubes 50 that penetrate holes 49. The bracket wingpieces 44 may be fabricated of 16 gauge galvanized steel, or the like, and connected to the bottom 41 or the upper bracket 40. The holes 49 and 52 align with holes pre-drilled in the roof sheet to allow tubes 50 to pass through and may include grommets 55 that isolate the supply and return connection tubes 50 from the flange 43 and bracket wingpiece 44, respectively. After the upper bracket 40 is secured to the framing member, the connection tubes 50 are pushed through the aligning holes 49 and 52, and are held in their position as the screws 53 are tightened. This exemplary embodiment allows a single installer to secure the pipes. In an alternate exemplary embodiment, screws 53 that are on the connection tubes 50 are not used and the connection tubes 50 are held in place by the compression fittings 58 above the roof sheet, placed by a second installer on top of the roof. Each flange 43 also includes two holes 56 and two nuts 57 connected to the underside of the flange 43 to receive mounting bolts (not shown) from above.

An upper plate 60 includes a rim 61 extending perpendicularly upward from the plate 60, a nut 63 affixed to the plate 60 to receive bolts 71 that connect the upper end of the ICS unit 1 to the strut 7, bracket connection holes 64, glazing connection holes and nuts 59 disposed on the rim 61, and tubing holes 49. Other parts of the mounting hardware include mounting bolts 65 and foam gasket 66. The upper plate 60 disposed above the roof sheet completes a clamp around the framing member to provide a rapid and secure connection to the glazing top edge 22 to resist wind uplift, and helps prevent water leakage around the roof penetrations. The upper plate 60 may be fabricated of 10 gauge galvanized steel, or the like. As the upper plate 60 is tightened against the roof surface using four mounting bolts (not shown) that connect into nuts 57, the foam gasket 66 is compressed to seal around the connection tubes 50 and the mounting bolts, as well as between the upper plate 60 and the roof. The rim 61 deflects roof water away from the connections, and caulking will typically be applied between the upper plate 60 and the roof surface (not shown).

During installation the four mounting bolts are driven through the holes 64 in the upper plate 60 into the nuts 57 on the upper bracket 40. In an exemplary embodiment, the gasket 66 may be made of a closed-cell gasket material that assists the rim 61 in preventing water leakage. The thickness of the gasket 66 may be varied according to the nature of the mounting surface.

Connection tubes 50 are inserted through the holes 52, 49 in the bracket wingpiece 44, flange 43 and upper plate 60, respectively. The connection tubes 50 may be temporarily secured using either of the methods described above.

At the lower end of the ICS unit 1, the roof is clamped between the lower bracket 36 and the lower plate 62 (FIG. 7). The lower bracket 36 has a U-shape including a bottom 39, two parallel sides extending upwardly from the bottom 39, and flanges 38 extending at right angles from the sides. Nuts 57 are attached to the flanges 38 under clearance holes 56 in the flanges 38. In an exemplary embodiment of the invention, the bottom 39 of the lower bracket 36 is wider than the bottom 41 of the upper bracket 40 to allow the lower brackets to align vertically if the framing member 45 is not plumb. The mounting bolts 65 are driven through clearance holes 64 in the lower plate 62 disposed above the roof sheet, and clearance holes 56 located in the flanges 38 of the lower bracket 36 into nuts 57 to clamp the lower mounting system. In an exemplary embodiment, doughnuts (not shown) may be disposed over the clearance holes 56 to form a seal between the lower bracket 36 and the lower plate 62. The doughnuts 37 that may be made of a closed cell foam, are compressed to seal the roof penetrations when the mounting bolts 65 are tightened into the nuts 57 to hold the lower plate 62 tightly against the roof surface. The lower plate 62 is bracket-shaped and includes recess 81 to receive a connecting pin 29 on the connection strut 7 of the ICS unit 1 (FIG. 5).

After the upper plate 60 and the lower plate 62 are secured in place and the compression fittings 58 are placed on the connection tubes 50 and tightened, the roof is ready to receive the ICS unit 1. The roof is watertight at this point, so the ICS unit 1 may be installed at any convenient time without worry of leakage at the roof penetrations.

To install the ICS unit 1 to the upper plate 60 and the lower plate 62, the lower edge of the ICS unit 1 is lowered into position such that the connecting pin 29 in the connection strut 7 engages with the recess 81 in the lower plate 62. With the connecting pin 29 engaged, the upper edge of ICS unit 1 is then lowered into position. The upper rim of glazing subassembly 20 is lifted and/or tilted to expose the connection recess 14 (see FIG. 4) at the top of the ICS unit 1. With the glazing assembly 20 lifted and held in position, the installer guides the inlet 4 and the outlet 5 of the heat exchanger 3 into the ends of the compression fittings 58. The upper edge of the ICS unit 1 may then be lowered into position so that the underside of the connection strut 7 contacts the upper plate 60. The ends of the inlet 4 and the outlet 5 are tapered to a slightly smaller diameter than the inside of the compression fittings 58 to facilitate insertion of the inlet 4 and the outlet 5 into the compression fitting 58. When the inlet 4 and the outlet 5 are fully inserted into the compression fitting 58, the compression nuts on the compression fittings 58 are tightened to make watertight connections.

In this position the slotted hole 31 at the upper end of the connection strut 7 aligns with a nut 63 connected to the upper plate 60. A bolt 71 is driven through the slotted hole 31 in the connection strut 7 into the nut 63 on the upper plate 60 to structurally secure the top of ICS unit 1 to upper plate 60. The water box 2a may now be filled with water, as described above, using the fill ports 6 with the caps 6a removed therefrom. After the ICS unit 1 is filled with water and the caps 6a are replaced on the fill ports 6, the heat exchanger 3 may be pressurized and the compression fittings 58 checked for leakage. When the compression fittings 58 are made watertight, the glazing subassembly 20 is lowered into a closed position and glazing bolts 67 are inserted through clearance holes 68 in the top extrusion 22 and screwed into receiving nuts 59 disposed in the rim 61 of the upper plate 60 to complete installation of the ICS unit 1 on the roof.

In various exemplary embodiments, the ICS unit 1 may be installed with or without underside insulation. This insulation may be placed on the underside of the panel and ribbed to match, or may be blankets placed between the roof framing members under the roof.

Although the invention has been described with reference to various exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, others combinations and configurations, including more, less, or only a single element, are also within the spirit and scope of the invention.

What is claimed is:

1. A solar water heater, comprising:
   an integrally molded fluid container having a unitary, one-piece construction that includes a top surface, a bottom wall and peripheral side walls, wherein at least one structural connection is disposed between the top surface and the bottom wall to provide structural support to the molded fluid container, the container defining an interior space for holding a liquid under atmospheric pressure;
   a heat exchanger disposed within the liquid in the interior space of the molded fluid container, the heat exchanger containing a fluid pressurized above atmospheric pressure; and
   a glazing subassembly disposed over the molded fluid container.

2. The solar water heater as in claim 1, wherein the top surface absorbs solar energy and the side walls slope inwardly toward the top surface to enhance the amount of solar gain to the molded fluid container when solar rays are at an oblique angle to the top surface of the molded fluid.

3. The solar water heater as in claim 1, wherein the at least one structural connection is formed integrally with the molded fluid container.

4. The solar water heater as in claim 1, wherein the at least one structural connection has a truncated cone shape.

5. The solar water heater as in claim 1, wherein the heat exchanger is integrally molded within the molded fluid container.

6. The solar water heater as in claim 1, wherein the solar water heater is in contact with a mounting surface and the molded fluid container includes a plurality of ribs disposed on an underside of the bottom wall of the molded fluid container to provide elongated air spaces between the ribs to allow air to circulate between the molded fluid container and the mounting surface.

7. The solar water heater as in claim 6, wherein the air spaces are open at a lower end to provide ventilation between the water heater and the mounting surface, and are substantially closed at an upper end to prevent entry of foreign objects into the air spaces.

8. The solar water heater as in claim 7, wherein the open lower ends of the air spaces are covered with a porous material to prevent entry of foreign objects while allowing air movement between the water heater and the mounting surface.

9. The solar water heater as in claim 1, wherein the molded fluid container is tapered from a lower portion having a narrower profile to an upper portion having a thicker profile.

10. The solar water heater as in claim 9, wherein a plurality of the structural connections are spaced more closely near the lower portion of the molded fluid container than at the upper potion to provide increased strength to the molded fluid container where hydraulic pressure is highest.

11. The solar water heater as in claim 1, wherein the molded fluid container further comprises at least two through-connects wherein a first through-connect extends downwardly from the top surface and a second through-connect extends upwardly from the bottom wall and the through-connects support the heat exchanger.

12. The solar water heater as in claim 1, wherein the heat exchanger includes an inlet and an outlet that penetrate a surface of the molded fluid container and an integral seal is formed around the inlet and outlet during a molding process.

13. The solar water heater as in claim 12, wherein the inlet and the outlet are located at about the horizontal center of the molded fluid container to minimize any leakage caused by expansion and contraction of fluid supply pipes connected to the inlet and outlet at mounting surface penetration locations.

14. The solar water heater as in claim 1, wherein the molded fluid container includes at least one fill port.

15. The solar water heater as in claim 1, wherein the molded fluid container includes a recess in an upper portion to allow at least one of plumbing connections and mounting connections to be completed.

16. The solar water heater as in claim 1, further comprising:
   a structural member attachable to the underside of the bottom wall of the molded fluid container to facilitate mounting the solar water heater to a mounting surface; and
   a support toe attachable to the structural member at a lower end of the structural member, wherein the support toe provides an interconnect between the glazing subassembly and the molded fluid container.

17. The solar water heater as in claim 1, wherein the glazing subassembly further comprises:

a glazing panel; and edge extrusions formed around the periphery of the panel, wherein the edge extrusions include at least one projection to retain an upper sealant to maintain a seal between the glazing subassembly and the molded fluid container and at least one recess to retain a lower sealant to maintain a seal between the glazing subassembly and a mounting surface.

18. The solar water heater as in claim 17, wherein the glazing panel is thermally formed from a polymeric sheet having a top surface and sides that slope inwardly toward the top surface of the glazing panel, relatively parallel to the sides of the molded fluid container edges to enhance the amount of solar gain to the molded fluid container when solar rays are at an oblique angle to the top surface of the molded fluid container.

19. The solar water heater as in claim 17, wherein the glazing panel is structurally reinforced at the edges by perimeter extrusions joined to the glazing panel and the extrusions interlock with the edges of the glazing panel to prevent the glazing panel from separating from the extrusions under wind uplift forces.

20. The solar water heater as in claim 1, wherein the glazing subassembly is attached to a flexible connection that is attached to a support toe at a lower edge of the molded fluid container and to a mounting plate at an upper edge of the molded fluid container, wherein the flexible connection allows the glazing subassembly to be pivoted to provide access to the molded fluid container and at least one of plumbing connections and mounting connections.

21. The solar water heater as in claim 17, wherein the glazing panel includes projections formed on an interior surface of the panel to maintain an air space between the glazing panel and the top surface of the molded fluid container.

22. The solar water heater as in claim 17, wherein the glazing panel is retained to the molded fluid container with a plurality of removable clips and a side of each clip is held in contact with an outward edge of the extrusion.

23. The solar water heater as in claim 1, further comprising mounting hardware to secure the solar water heat to a mounting surface, wherein the mounting hardware includes:

a structural member attachable to an underside of the bottom wall of the molded fluid container to facilitate mounting of the solar water heater to the mounting surface;

a support toe attachable to the structural member at a lower end of the structural member, wherein the support toe provides an interconnect between the glazing subassembly and the molded fluid container;

an upper plate detachably connected to an upper portion of the structural member;

an upper bracket disposed below the mounting surface substantially opposite the upper plate that bears on and substantially surrounds a support member of the mounting surface;

a lower plate detachably connected to a lower portion of the structural member;

a lower bracket disposed below the mounting surface substantially opposite the lower plate, wherein the lower bracket bears on and substantially surrounds the support member; and a plurality of fasteners to connect the upper and lower plates to the upper and lower brackets, respectively.

24. The solar water heater as in claim 23, wherein a bottom and a side of at least one of the brackets is open to allow the bracket to fit around a co-planar joint between the structural member and a supporting web member at the underside of the structural member.

25. The solar water heater as in claim 23, wherein at least one of the plates and at least one of the brackets include at least one matching clearance hole to provide passage for a fluid supply line to be connected to the heat exchanger.

26. The solar water heater as in claim 23, wherein at least one of the upper bracket and the lower bracket include at least one tab portion that extends orthagonally from a side of the bracket disposed adjacent to a clearance hole and the tab includes a hole to receive a fastener that retains the fluid supply line in a desired position.

27. The solar water heater as in claim 23, further comprising a gasket disposed between at least one of the plates and the mounting surface, wherein the gasket prevents water penetration.

28. The solar water heater as in claim 23, wherein the plates include rims that project upwardly along an upper edge of the plates to deflect water on the mounting surface away from the fasteners and mounting surface penetration.

29. The solar water heater as in claim 23, wherein the structural member is a channel-type strut having a back and two projections that extend from the back, wherein the strut detachably connects to the lower plate by a pin that passes through each projection of the channel-type strut and the lower plate to counter wind uplift of the solar water heater.

30. The solar water heater of claim 23, wherein the structural member is secured to the molded fluid container with at least one fastener inserted through sealed, molded penetrations in the container.

* * * * *